United States Patent [19]

Zegarski et al.

[11] 4,354,652
[45] Oct. 19, 1982

[54] SENSOR MOUNTING ASSEMBLY

[75] Inventors: Ronald J. Zegarski, Crystal Lake; Philip J. Burnstein, Skokie; George R. Pariza, Batavia, all of Ill.

[73] Assignee: Pittway Corporation, Aurora, Ill.

[21] Appl. No.: 158,357

[22] Filed: Jun. 11, 1980

[51] Int. Cl.³ .............................................. F16M 11/00
[52] U.S. Cl. ................................ 248/201; 248/DIG. 9
[58] Field of Search .............. 248/201, 214, 215, 237, 248/242, 256, 257, 265, 274, 542, 544, DIG. 9, DIG. 11, DIG. 12

[56] References Cited

U.S. PATENT DOCUMENTS

| 371,665 | 10/1887 | Brinkerhoff | 248/214 X |
|---|---|---|---|
| 2,126,114 | 8/1938 | Jett | 248/DIG. 9 |
| 2,460,193 | 1/1949 | Raudenkolb | 248/265 X |
| 2,677,523 | 5/1954 | Henley | 248/265 |
| 4,033,534 | 7/1977 | Bergkvist | 248/DIG. 9 |
| 4,247,070 | 1/1981 | Dirksing | 248/215 X |
| 4,275,939 | 6/1981 | Odermann | 248/558 X |

*Primary Examiner*—William H. Schultz
*Attorney, Agent, or Firm*—Dithmar, Stotland, Stratman & Levy

[57] ABSTRACT

A mounting assembly is provided for mounting a sensing component of an alarm system in a predetermined orientation adjacent to the inner edge of a door or window frame having an outer surface. The assembly includes two angle brackets adapted to fit over the inner edge of the frame, each having a support flange and a positioning flange. A flat planar support surface on each support flange is arranged in a predetermined orientation for receiving thereagainst a flat planar mounting surface of the sensing component mounting member. Locating pins on the support surfaces are receivable in locating holes in the mounting member to facilitate alignment of the screw apertures in the mounting member and bracket for fastening them together and to the door frame. Steps on the positioning flange facilitate cutting same to a desired length.

15 Claims, 12 Drawing Figures

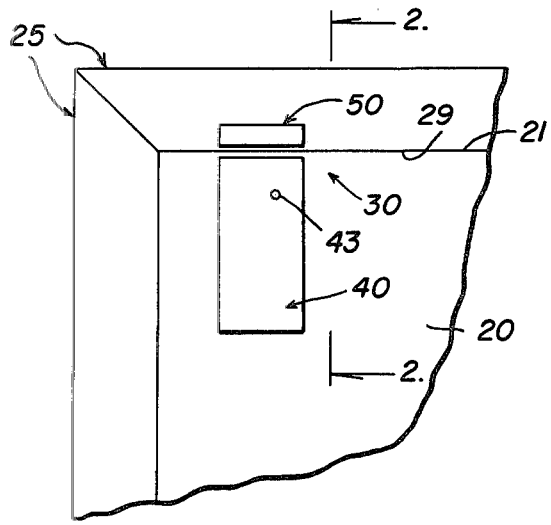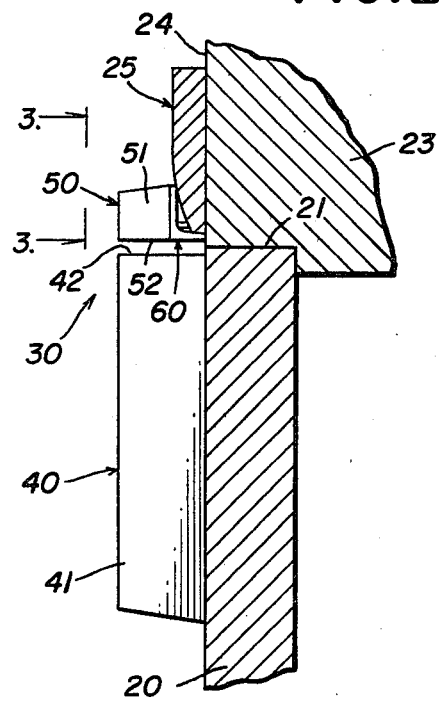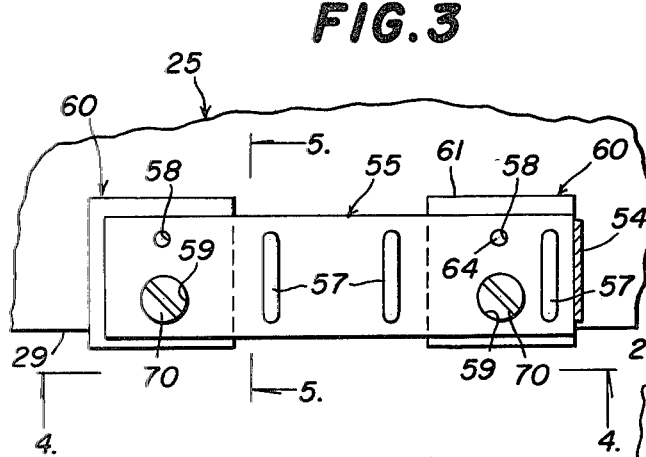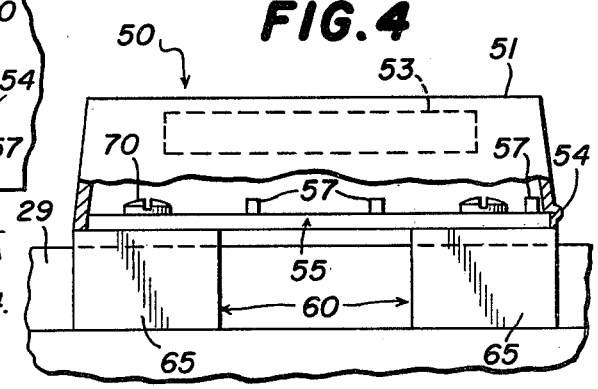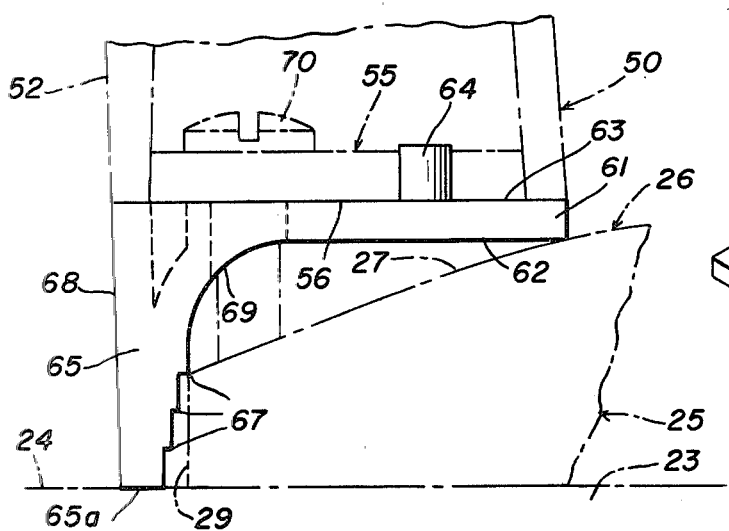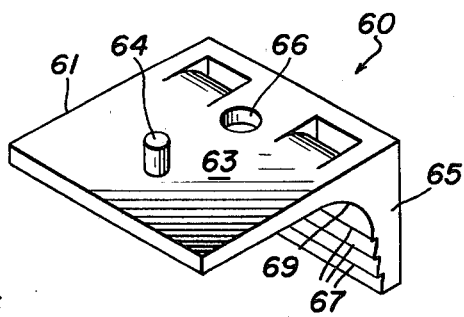

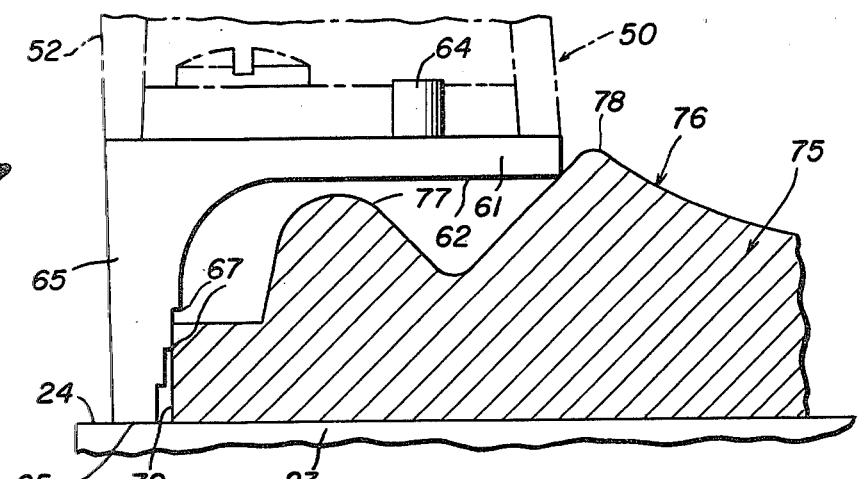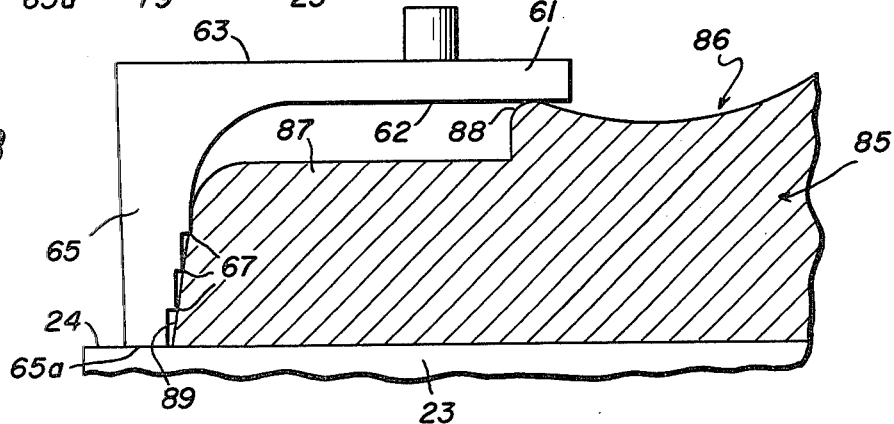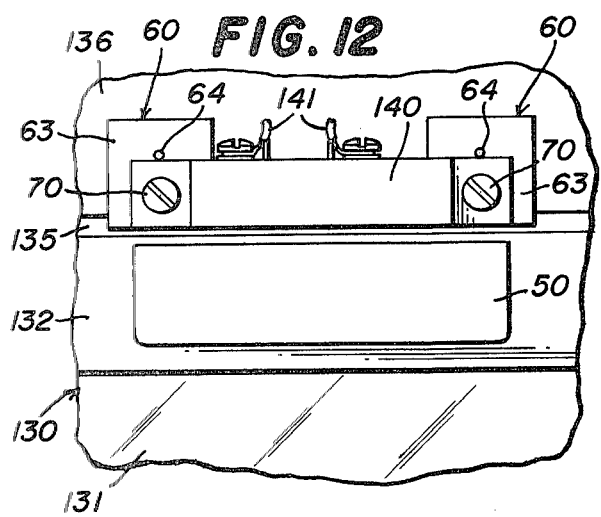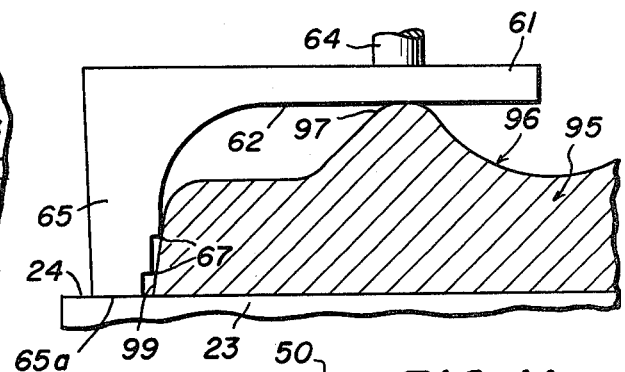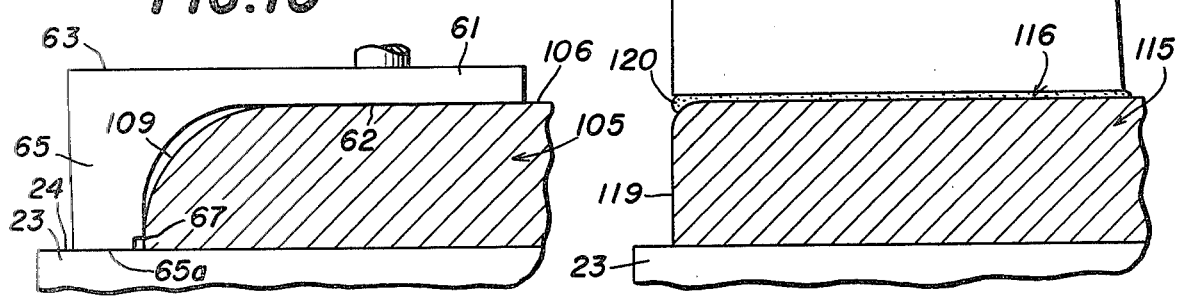

ic_4,354,652

SENSOR MOUNTING ASSEMBLY

BACKGROUND OF THE INVENTION

The present invention relates to a mounting assembly for mounting sensing components of an alarm system such as in a home security system. Such security systems may typically include a central receiving console and a plurality of sensors dispersed around the house, each such sensor including a sensing component for sensing a particular type of alarm condition, and a transmitter unit responsive to the detection of the alarm condition for transmitting a coded radio message to the receiving console, which in turn generates an alarm signal perculiar to the particular type of alarm condition.

One of the standard alarm conditions to be detected is unauthorized intrusion through an outside door or window. At each such door or window there is located a sensor which includes a switch component and a magnet component. In some installations, the switch component is mounted on the moving part (the window or the door) and the magnet component is mounted on the stationary part (the frame for the window or door). In other installations, the switch component may be mounted on the stationary part and the magnet component is mounted on the moving part. Associated with the switch component in either type of installation is a transmitter unit which may be in the same housing or in a separate housing. In either type of installation, the switch is disposed closely adjacent to the magnet when the door or window is closed, causing the switch to be held open. When the door or window is opened, the magnetic attraction of the permanent magnet is broken, and the switch closes, thereby to energize the transmitter and signal an alarm condition.

In order for the magnetic intrusion sensor to work effectively, it is essential that the magnet component and the switch component be closely and accurately positioned with respect to each other in a predetermined orientation. This would present no difficulty were all door and window frames of a standard size and shape. In fact, such frames come in a wide variety of styles and shapes, particularly those in residential use. This variety of door and window frame styles makes proper spacing and orientation of the magnet and switch componets with respect to each other difficult wherever the outer surface of the door or window frame is not a flat planar surface, which is true in the majority of cases.

SUMMARY OF THE INVENTION

The present invention relates to a unique mounting assembly for a sensing component of an alarm system which avoids the disadvantages of prior arrangements.

It is a general object of this invention to provide a mounting assembly for mounting a sensing component of an alarm system in a predetermined orientation adjacent to the inner edge of a door or window frame having a non-planar outer surface, regardless of the shape of the outer surface.

It is another object of this invention to provide a mounting assembly of the type set forth which includes an adapter bracket designed to fit any shape door or window frame and adapted to be connected to both the frame and the sensor unit.

In connection with the foregoing object, it is another object of this invention to provide a mounting assembly of the type set forth which includes locating means to facilitate accurate positioning of the sensing component on the adapter bracket.

These and other objects of the invention are attained by providing a mounting assembly for mounting a sensing component of an alarm system in a predetermined orientation adjacent to the inner edge of a door or window having a substantially planar first outer surface, a frame being attached to the first outer surface and having a second outer surface, the assembly comprising at least one adapter bracket adapted for mounting on the associated frame, the adapter bracket including a support member having a flat planar support surface and a first bearing surface adapted for engagement with the second outer surface, a positioning flange on the support member and extending from the first bearing surface along one edge thereof, the outer end of the positioning flange having a second bearing surface adapted for engagement with the first outer surface, the bearing surface being constructed and arranged with respect to the outer surfaces to cause the support surface to be substantially parallel to the first outer surface in use, the positioning flange having on one side thereof a plurality of substantially parallel steps along which the positioning flange can be cut to control the length thereof, and a sensing-component housing positioned on the support surface and being adapted for attachment thereto and to the associated frame to hold the bearing surfaces respectively in contact with the outer surfaces.

Further features of the invention pertain to the particular arrangement of the parts of the mounting assembly whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a fragmentary elevational view of a portion of a door and associated door frame in the closed position and having mounted thereon a magnetic intrusion sensor in accordance with the present invention;

FIG. 2 is an enlarged fragmentary view taken along the line 2—2 in FIG. 1;

FIG. 3 is a further enlarged front elevational view of the magnet unit taken along the line 3—3 in FIG. 2 and illustrated with the cover of the magnet unit removed;

FIG. 4 is a bottom plan view of the magnet unit mounting assembly taken along the line 4—4 of FIG. 3, with portions of the magnet unit housing broken away more clearly to show the interconnection of the parts;

FIG. 5 is a still further enlarged fragmentary view taken along the line 5—5 in FIG. 3 and rotated 90° clockwise and illustrating the cooperation between the adapter bracket with the associated door frame and the magnet unit;

FIG. 6 is a perspective view of one of the adapter brackets of the present invention;

FIG. 7 is a view similar to FIG. 5, illustrating the mounting assembly of the present invention mounted on a door frame of a different transverse cross section;

FIGS. 8 through 10 are all views similar to FIG. 5 and illustrating the mounting bracket of the present invention mounted on still other styles of door frame;

FIG. 11 is a view similar to FIG. 5 illustrating the mounting of a magnet unit directly on a flat planar door frame without the use of the adapter bracket of the present invention; and FIG. 12 is a fragmentary elevational view of a portion of a window and associated window frame, and having associated therewith a magnetic intrusion sensor, in accordance with another use of the present invention.

DESCRIPTION OF THE PREFERRED EMBODIMENT

Referring now to FIGS. 1 and 2 of the drawings, there is illustrated a door 20 and associated frame members 25 having mounted thereon an intrusion sensor, generally designated by the numeral 30. The door 20 is illustrated in its closed position, with the upper edge 21 thereof disposed in a doorway in a wall 23. Each of the frame members 25 is in the form of a molding or border piece disposed on the planar outer surface 24 of the wall 23 along one edge of the doorway. Each frame member 25 has an outer or facing surface 26 including a curved portion 27 which terminates at a flat inner edge surface 29 adjacent to the doorway (see FIG. 5).

The sensor 30 includes a transmitter unit, generally designated by the numeral 40, and a magnet unit, generally designated by the numeral 50. The transmitter unit 40 includes a rectangular box-like housing 41 having a flat planar upper surface 42, the transmitter unit 40 preferably being provided with a monitor light 43 for indicating when the transmitter unit is transmitting. In use, the transmitter unit 40 is positioned at the upper end of the door 20 near the side edge most remote from the hinges, with the upper surface 42 disposed closely adjacent and parallel to the upper edge 21 of the door 20. It will be understood that the transmitter unit 40 includes a magnetic switch (not shown) disposed in the housing 41 closely adjacent to the upper surface 42 thereof.

Referring also to FIGS. 3 and 4 of the drawings, the magnet unit 50 includes a generally box-like housing 51 having a flat planar side surface 52 along one side thereof. The housing 51 preferably has mounted therein a bar or rod-shaped permanent magnet 53. The housing 51 has a flat rectangular mounting wall 55 which is connected to the remainder of the housing 51 by a flexible hinge 54 and provides a door which is movable between open and closed positions for providing access to the interior of the housing 51, the mounting wall 55 preferably being held in its closed position by a snap-acting latch mechanism (not shown) or the like. The outer surface of the mounting wall 55 defines a flat planar mounting surface 56, while the inner surface of the mounting wall 55 has formed thereon a plurality of upstanding reinforcing ribs 57. Also formed in the mounting wall 55, respectively adjacent to the opposite ends thereof are two small circular locating holes 58 and two larger fastener apertures 59.

In operation, the magnet unit 50 is to be mounted on the door frame member 25 adjacent to the inner edge thereof so that the side surface 52 is disposed substantially parallel and closely adjacent to the upper surface 42 of the transmitter unit housing 41. The proper spacing and orientation is essential to insure that the magnetic field of the magnet unit 50 is such as normally to hold the transmitter switch off and permit it to turn on when the door is opened a predetermined slight distance. The proper spacing and positioning of the parts is relatively easy if the facing surface of the door frame member is a flat planar surface substantially parallel to the surface of the door 20 on which the transmitter unit 40 is mounted. In that case, the magnet unit 50 could be mounted directly on the frame member. For that purpose, the mounting wall 55 of the housing 51 would be opened, and would be arranged in the desired orientation with the mounting surface 56 thereof against the facing surface of the frame member. Suitable fasteners would then be received through the fastener apertures 59 securely to attach the mounting wall 55 to the frame member in the desired position, whereupon the housing 51 could be closed.

Normally, however, the facing surface of the frame member is curved or irregular, as at 26, and does not provide a suitable platform for accurate positioning of the magnet unit 50 thereon. Accordingly, it is a significant feature of the present invention that there are provided adapter brackets, generally designated by the numeral 60, for mounting the magnet unit 50 on the door frame member 25. Referring also to FIGS. 5 and 6 of the drawings, the adapter bracket 60 is preferably of integral one-piece construction and is generally in the shape of an angle bracket including a substantially rectangular support flange 61 and a substantially rectangular positioning flange 65 disposed generally perpendicular to each other.

The support flange 61 has a flat, planar bearing surface 62 on the inner side thereof and a flat, planar support surface 63 on the outer side thereof, substantially parallel to the bearing surface 62. Projecting outwardly from the support surface 63 is a short cylindrical locating pin 64. Formed through the support flange 61 is a fastener aperture 66. The positioning flange 65 terminates at a flat, planar distal end or bearing surface 65a which is preferably substantially parallel to the support surface 63. The positioning flange 65 has a flat, planar outside surface 68 and is provided along its inside with a plurality of ribs or steps 67 which extend laterally the entire width of the positioning flange 65, three such steps being illustrated in the drawings. The upper one of the steps 67 is connected to the bearing surface 62 by an arcuate connecting surface 69. Preferably, the support flange 61 is substantially longer than the positioning flange 65.

Two of the adapter brackets 60 are preferably used for mounting the magnet unit 50, since the adapter brackets 60 are substantially shorter than the magnet unit housing 51. Thus, one of the adapter brackets 60 is disposed at each end of the housing 51, with the mounting surface 56 disposed against the support surfaces 63 of the adapter brackets 60. The locating pins 64 are respectively dimensioned for being received in the locating holes 58 in the mounting wall 55 of the magnet unit 50. The parts are so dimensioned and arranged that when the locating pins 64 are thus disposed in the locating holes 58, and the positioning flanges 65 of the adapter brackets 60 are disposed substantially parallel and adjacent to the side surface 52 of the housing 51, the fastener apertures 59 in the mounting wall 55 will be aligned respectively with the fastener apertures 66 in the adapter brackets 60 for receiving therethrough suitable fasteners, such as screws 70.

The adapter brackets 60 are positioned over the inner edge of the door frame member 25 adjacent to the transmitter unit 40. More particularly, the adapter brackets 60 are arranged with the bearing surfaces 62 and 65a respectively in engagement with the surfaces 26 and 24. The interrelationship of these bearing and support surfaces is such that each support surface 63 is substantially parallel to the surface 24. When thus arranged, one or more of the steps 67 may engage the frame member 25. Screws 70 are driven into the frame member 25 securely to attach the adapter brackets 60 to the frame member 25 and to the mounting wall 55 of the housing 51. The mounting assembly is thus complete and the magnet unit 50 is securely mounted in place on the door frame member 25, whereupon the magnet unit housing 51 may be closed.

Referring now also to FIGS. 7–10 of the drawings, there are illustrated four different shapes of frame member, respectively generally designated 75, 85, 95 and 105, to illustrate the universal nature of the adapter brackets 60 which permit maintenance of the desired orientation of the magnet unit 50 while being mounted on various shapes of frame member. More specifically, the frame member 75 illustrated in FIG. 7 has an irregular facing surface 76 which includes two protruding ridges 77 and 78 and a flat inner edge surface 79. It can be seen that when the support flange 61 of the adapter brackets 60 is parallel to the wall 23, with the steps 67 in engagement with the inner edge surface 79 of the frame member 75, the distal edge of the bearing surface 62 will be disposed in engagement with the ridge 78 on the frame member 75, and the bearing surface 65a will be in engagement with the surface 24.

Referring to FIG. 8, the frame member 85 has an irregular facing surface 86 including a flat, planar inner portion 87 and an elevated step portion 88, the inner edge surface 89 of the frame member 85 being inclined with respect to the associated wall 23. It can be seen that, with the bearing surface 62 in engagement with the support surface 86 of the elevated step portion 88, and the bearing surface 65a in engagement with the support surface 24 of the wall 23, the support surface 63 will be positioned parallel to the surface 24.

In FIG. 9 there is disclosed a frame member 95 which is somewhat thinner than those previously described. The frame member 95 has an irregular facing surface 96 being characterized by a central ridge 97, the inner edge surface 99 of the frame member 95 being slightly inclined with respect to the surface 24 of the associated wall 23. It will be noted that because of the shape and relative thinness of the frame member 95, it is not possible to having the bearing surface 62 in engagement with the facing surface 96 of the frame member 95. Thus, the distal end of the positioning flange 65 may be cut off to the desired length, as illustrated in FIG. 9, along a selected one of the steps 67 so that its end surface 65a engages the surface 24 of the wall 23; also, the bearing surface 62 engages the surface of the ridge 97, thereby holding the support surface 63 substantially parallel to the surface 24.

A similar arrangement is illustrated in FIG. 10, wherein the frame member 105 is relatively narrow and has a flat, planar facing surface 106 and an arcuate inner edge surface 109. Again, because of the particular size and geometry of the frame member 105, it is necessary to truncate the positioning flange 65 along one of its ridges 67 in order simultaneously to have the bearing surface 62 engage the facing surface 106 of the frame member 105 and have the bearing surface 65a on the distal end of the positioning flange 65 engage the wall surface 24 for holding the support surface 63 parallel thereto.

In FIG. 11 there is illustrated an alternative mounting arrangement for the magnet unit 50 which is usable in the case of a door frame member 115 having a flat, planar facing surface 116 and a substantially perpendicular flat inner edge surface 119. As was indicated above, in such circumstances the mounting wall 55 of the magnet unit 50 may be fastened directly to the frame member 115 by the use of the screws 70. An alternative mounting arrangement is employed, wherein an adhesive such as doublesided tape 120 may be utilized along the mounting surface 56 of the magnet unit 50 for securely attaching the magnet unit 50 to the frame member 115.

A further use of the invention is depicted in FIG. 12, wherein the intrusion sensor is employed in association with a window. The window 130 includes a pane of glass 131 and the usual frame 132 in which the pane 131 is mounted. The window is located in a wall 135 having a frame 136 surrounding the opening within which the window 130 is located. The magnet unit 50 is mounted on the window frame 132, that is, the movable component. (In the embodiment of FIGS. 1–11, the magnet unit 50 is mounted on the fixed component.) Mounted on the window frame 136 is a switch component 140 connected by wires 141 to a transmitter unit (not shown) like the transmitter unit 40 (FIG. 1) mounted on the wall 135. Because the external switch 140 is employed, the switch internally of the transmitter unit 40 would not be employed.

The adapter brackets 60 are used for mounting the switch component 140 on the frame 136. The bearing surfaces 62 and 65a (FIG. 5) of the adapter bracket 60 are in engagement respectively with the outer surface of the frame 136 and the outer surface of the wall 135. The interrelationship of these bearing surfaces and support surfaces is such that the support surface 63 of each of the brackets 60 is substantially parallel to the outer surface of the wall 135. Screws 70 are driven through the housing of the switch component 140, through the adapter bracket 60 and into the frame 136, as in the first embodiment.

In a constructional model of the present invention, the adapter bracket 60 is of integral one-piece construction molded of plastic such as polypropylene, although it will be understood that any other suitable non-magnetic materials could be used. The screws 70 may be wood or metal screws, depending upon the material of the door frame member.

From the foregoing it can be seen that there has been provided an improved mounting assembly for a sensing component of an alarm system which permits the sensing component to be mounted in a predetermined stable and dependable orientation regardless of the geometry of the frame of the door or window.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An adapter bracket for mounting a sensing component of an alarm system in a predetermined orientation adjacent to the inner edge of a door or window having a substantially planar first outer surface, a frame being attached to the first outer surface and having a second outer surface, said bracket comprising a support member having a flat planar support surface adapted for receiving the associated sensing component thereon and having a first bearing surface adapted for engagement with the second outer surface, a positioning flange on said support member and extending from said first bearing surface along one edge thereof, the outer end of said positioning flange having a second bearing surface generally parallel to said support surface and adapted for abutting engagement with the first outer surface, and a plurality of steps formed on one side of said positioning flange and each having first and second intersecting surfaces, each of said first surfaces being substantially parallel to said support surface and providing a surface along which said positioning flange can be cut to provide a new second bearing surface thereby to control the length of said positioning flange.

2. The adapter bracket of claim 1, wherein said bracket is of integral one-piece construction.

3. The adapter bracket of claim 1, wherein said positioning flange and said support member are disposed substantially perpendicular to each other.

4. The adapter bracket of claim 1, wherein each of said steps extends laterally the full width of said positioning flange.

5. The adapter bracket of claim 1, wherein said support member has an aperture therethrough for receiving an associated fastener.

6. The adapter bracket of claim 1, wherein said first bearing surface and said support surface are substantially parallel.

7. The adapter bracket of claim 1, and further including locating means disposed on said support surface for facilitating the positioning of the associated sensing component thereon.

8. A mounting assembly for mounting a sensing component of an alarm system in a predetermined orientation adjacent to the inner edge of a door or window having a substantially planar first outer surface, a frame being attached to the first outer surface and having a second outer surface, said assembly comprising at least one adapter bracket adapted for mounting on the associated frame, said adapter bracket including a support member having a flat planar support surface and a first bearing surface adapted for engagement with the second outer surface, a positioning flange on said support member and extending from said first bearing surface along one edge thereof, the outer end of said positioning flange having a second bearing surface generally parallel to said support surface and adapted for abutting engagement with the first outer surface, said positioning flange having a plurality of steps formed on one side thereof and each having first and second intersecting surfaces, each of said first surfaces being substantially parallel to said support surface and providing a surface along which said positioning flange can be cut to provide a new second bearing surface thereby to control the length of said positioning flange, and a sensing-component housing positioned on the support surface and being adapted for attachment thereto and to the associated frame thereby holding said bearing surfaces respectively in contact with the outer surfaces.

9. The mounting assembly of claim 8, wherein said assembly includes two of said adapter brackets spaced apart a predetermined distance and arranged with the support surfaces thereof substantially coplanar, said housing having an elongated mounting surface with opposite ends respectively positioned against the support surfaces of said adapter brackets.

10. The mounting assembly of claim 8, wherein each of said support member and said housing has an aperture therethrough for receiving an associated fastener.

11. The mounting assembly of claim 8, wherein said adapter bracket includes a locating pin projecting outwardly from said support surface, said housing having a locating hole therethrough adapted to receive said locating pin accurately to position said housing on said support surface.

12. The mounting assembly of claim 11, wherein each of said support member and said housing has an aperture therein for receiving an associated fastener therethrough, said apertures being disposable in alignment when said locating pin is disposed in said locating hole.

13. The mounting assembly of claim 12, and further including a fastener receivable through the aligned apertures in said support member and said housing.

14. The mounting assembly of claim 8, wherein each of said adapter bracket and said housing is of integral one-piece construction.

15. The adapter bracket of claim 1, wherein the lines of intersection of said first and second surfaces of said steps define a plane which is inclined at an acute angle with respect to said support surface.

* * * * *